United States Patent
Cunningham

[19]

[11] Patent Number: 5,978,163
[45] Date of Patent: Nov. 2, 1999

[54] CIRCUIT AND METHOD FOR OPTIMIZING BIAS SUPPLY IN A MAGNETORESISTIVE HEAD BASED ON TEMPERATURE

[75] Inventor: Earl Albert Cunningham, Rochester, Minn.

[73] Assignee: International Business Machines Corporation, Armonk, N.Y.

[21] Appl. No.: 08/717,918

[22] Filed: Sep. 23, 1996

[51] Int. Cl.[6] ..................................................... G11B 5/03
[52] U.S. Cl. .................. 360/66; 360/67; 360/68
[58] Field of Search ................................ 360/46, 66, 68, 360/113, 67

[56] References Cited

U.S. PATENT DOCUMENTS

| | | | |
|---|---|---|---|
| 4,492,997 | 1/1985 | Arai et al. | 360/113 |
| 4,691,259 | 9/1987 | Imakoshi et al. | 360/67 X |
| 4,712,144 | 12/1987 | Klaassen | 360/67 |
| 5,404,102 | 4/1995 | Gokhale et al. | 324/252 |
| 5,408,365 | 4/1995 | Van Doorn et al. | 360/46 |
| 5,412,518 | 5/1995 | Christner et al. | 360/66 |
| 5,440,233 | 8/1995 | Hodgson et al. | 324/252 |
| 5,461,517 | 10/1995 | Suda et al. | 360/53 |

FOREIGN PATENT DOCUMENTS

| | | |
|---|---|---|
| 60-98504 | 6/1985 | Japan . |
| 1-208708 | 8/1989 | Japan . |
| 2-304702 | 12/1990 | Japan . |
| 3-260902 | 11/1991 | Japan . |
| 4-305809 | 10/1992 | Japan . |
| 6-168408 | 6/1994 | Japan . |

OTHER PUBLICATIONS

"Circuit for Stabilizing Magneto–Resistive Heads", *IBM Technical Disclosure Bulletin*, vol. 31, No. 4, Sep. 1988, pp. 16–17.

Dols, C., et al., "Temperature–Regulated Bismuth Resistor for Magnetic–Field Measurements", *The Review of Scientific Instruments*, vol. 29, No. 5, pp. 349–354.

*Primary Examiner*—Aristotelis M. Psitos
*Assistant Examiner*—K. Wong
*Attorney, Agent, or Firm*—Schmeiser, Olsen & Watts

[57] ABSTRACT

A method and apparatus adaptively controls the bias supply source for magnetoresistive (MR) read heads within a Direct Access Storage Device (DASD) to provide an optimized bias level for the ambient temperature. An optimal bias level for a given ambient temperature is provided in real time by sensing a temperature within a thermal path to the head (e.g., the ambient temperature surrounding the head) and adjusting the bias supply level to the maximum allowable level for that temperature. This adjustable bias level will thereby enhance MR transducer head sensitivity, improve the signal-to-noise ratio, and also reduce errors in reading data from magnetic storage media within the DASD. The maximum allowable bias supply source level is controlled so as to preserve the overall life expectancy of the MR heads.

17 Claims, 3 Drawing Sheets

5,978,163

CIRCUIT AND METHOD FOR OPTIMIZING BIAS SUPPLY IN A MAGNETORESISTIVE HEAD BASED ON TEMPERATURE

RELATED APPLICATION

This application is related to a co-pending patent application by Earl A. Cunningham entitled "CIRCUIT AND METHOD FOR OPTIMIZING BIAS SUPPLY IN A MAGNETORESISTIVE HEAD BASED ON THE THERMAL PROPERTIES OF THE MR HEAD ITSELF", Ser. No. 08/720,550, filed Oct. 2, 1996.

BACKGROUND OF THE INVENTION

1. Technical Field

The present invention generally pertains to magnetic storage devices and more particularly to magnetoresistive (MR) transducer head elements.

2. Background Art

Our modern society is heavily dependant upon computer systems for everyday activity. Computers are found in our homes, in business offices, and in most production and manufacturing environments. Most computer systems are controlled by a central processing unit (CPU) and have various types of memory storage components which can be used by the CPU to operate and perform the various functions for which it has been programmed.

Traditionally, computer system memory storage components have been classified as either main memory (primary or main storage) or secondary memory (secondary storage). Information in main memory may be accessed directly by the CPU. Information in secondary memory, however, must be loaded into main memory for the CPU to access this information. Main memory is typically relatively small, fast, and expensive when compared to secondary storage components. As a result, computer systems typically rely on large quantities of secondary storage to economically hold a large amount of information that the CPU may need to access.

Secondary storage is often provided in the form of a Direct Access Storage Device (DASD). Typical examples of DASDs include hard disk drives, tape drive subsystems, and Compact Disk Read Only Memory (CD-ROM) drive units. Even entry-level home computer systems will have approximately 850 megabytes to two gigabytes of secondary storage, usually in the form of a single hard disk drive unit. Many of the newer home computer systems will also include a CD-ROM drive as well. Computer systems used in larger business and commercial operations often utilize multiple DASD units, with hard disk drives and tape backup systems being very common.

A typical hard disk drive unit is composed of multiple circular storage platters mounted inside a housing. The storage platters have a coating of magnetic material with small regions that define binary digits (or bits) that may be polarized in either of two directions. These magnetic storage platters are used by the computer system to store information that may be needed by the CPU. In order to store data on the platters, small read/write heads are placed in close proximity to the surface of the storage platters while the platters turn. During a write operation, the write heads change the magnetic characteristics of the surface of the platter, thereby storing data received from the CPU on the platter. During a read operation, the read heads sense the differences in the magnetic characteristics of the surface of the platter and transmit the data read from the platter to the CPU. A tape drive operates in a very similar manner but the storage medium takes the form of a magnetic tape instead of a platter.

The read heads of a DASD unit are frequently manufactured from magnetoresistive (MR) transducer elements. MR read head performance is significantly affected by several factors, most notably, ambient temperature and bias current. The effects of ambient temperature and bias current will be considered individually.

For the purposes of this discussion, ambient temperature is to be considered the temperature inside the DASD enclosure that houses the MR transducer heads and magnetic media (e.g., platters in a hard disk drive). Ambient temperature has a measurable effect on the performance of the DASD. When the ambient temperature decreases, the performance of the DASD degrades and error rates increase. While all of the reasons behind this phenomenon are not completely understood, the effect is most likely due to a combination of multiple factors. These factors include increases in the distance between the MR transducer heads and the surface of the storage media, higher levels of media noise, and poorer signal recording which, in turn, decreases the signal amplitude.

The effects of bias current on MR transducer head performance are more directly measurable. The ability to read a signal from the storage media is, in part, a function of the amount of bias current supplied to the MR head. Signal sensitivity can be increased by increasing the amount of bias current supplied to the MR head. Therefore, increased bias current will generally produce an improved signal-to-noise ratio and will therefore result in lower error rates. Signal-to-noise ratio is the comparison between the amount of desired data signal and the amount of undesired background signal that the MR read head and the other DASD components process. The signal-to-noise ratio can be improved by either increasing the signal level or decreasing the noise level. However, simply increasing the bias current is not a complete solution to improving MR read head performance because excessive bias current can significantly and unnecessarily shorten the useful life span of the MR read head.

Bias current can adversely affect MR read head life in two different ways. First, application of bias current in excessive quantities can cause the MR element to overheat. If the current density reaches a high enough level, the MR element will actually burn out. This type of catastrophic failure is typically avoided by selecting a bias current level for the MR read head that will keep the MR read head from burning out over the entire operating temperature range of the MR read head.

Catastrophic failure, however, is not the most common cause of MR read head failure. The most common cause of MR read head failure is a phenomenon known as electromigration. Constant exposure to even normal operating levels of bias current will, over an extended period of time, change the molecular structure of the MR read head, thereby degrading the magnetic sensing capability of the MR read head.

In existing DASD units, the MR heads are typically analyzed to determine the range of their operating characteristics over temperature and bias current variations. The performance of MR heads fabricated on a given fabrication line may vary considerably due to process variations that cause different geometric features on the heads. To assure that even the MR read head with the worst-case geometric tolerances will have at least the minimum desired lifetime, a bias current is selected for all of the MR read heads that will keep the temperature of all MR read heads below predetermined threshold levels. This pessimistic approach provides the desired minimum lifetime for the DASD unit, but does so at the expense of driving all heads with a bias current that is selected based on the worst-case. Of course, MR heads that are in the nominal range of manufacturing tolerances could be driven with a higher bias current to boost their performance without exceeding the relevant temperature thresholds, but this higher bias current would significantly shorten the life of MR heads at the worst-case of expected manufacturing variations in the MR heads. As a result, the maximum bias current for all heads is typically set to equal the maximum bias current for the worst-case head. Without new ways to provide bias current to MR read heads, the overall performance of DASD storage devices will be limited.

DISCLOSURE OF INVENTION

According to the present invention, a method and circuit adaptively controls the biasing supply source for magnetoresistive (MR) heads within a DASD to provide a bias current or voltage for the MR heads that varies with ambient temperature. The appropriate bias is determined in real time by sensing the ambient temperature surrounding the MR read heads and adjusting the bias supplied to the MR read heads to the allowable level for that ambient temperature.

The method and circuit seek to increase the bias current level as much as possible for a given ambient temperature in order to maximize MR read head performance while simultaneously maintaining the bias current at a level low enough to not arbitrarily and unnecessarily degrade the overall life expectancy of the MR transducer heads.

This temperature-compensated bias may be applied to all MR read heads in a DASD unit, or may be applied individually to each MR read head. Increasing the bias to compensate for lower ambient temperatures enhances the MR transducer head sensitivity, improves the signal-to-noise ratio, and thereby reduces errors in reading data from the magnetic storage media. The maximum allowable bias level is not exceeded to preserve the overall life expectancy of the MR heads.

One of the goals of the invention is to achieve increased sensitivity and to improve transducer head performance over a broad range of operating temperatures, while preventing MR transducer head damage due to self-heating at any operating temperature. While not a complete solution, the present invention can significantly improve the sensitivity and performance of MR read heads in a DASD unit.

If this invention is used in conjunction with a DASD unit that drives all MR read heads simultaneously at the same bias level, the performance of the DASD unit will be improved at temperatures below the design maximum operating ambient temperature.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
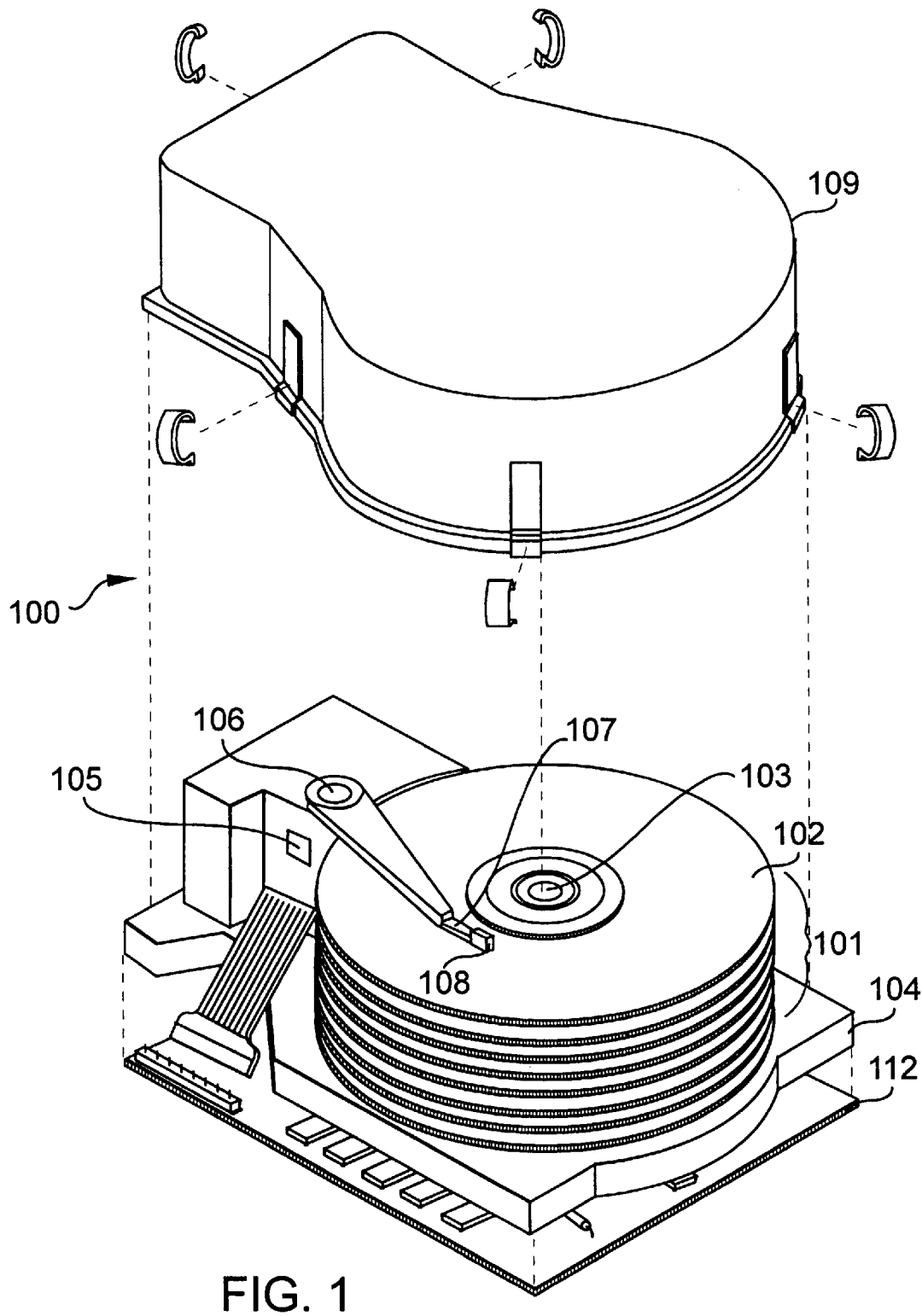
FIG. 1 shows a magnetic disk drive 100 utilizing a circuit according to a preferred embodiment of the present invention.

The Overview Section immediately below is intended to provide an introductory explanation of basic MR read head operation for individuals who need additional background in this area. Those who are skilled in the art may wish to skip this section and begin with the Detailed Description Section instead.

OVERVIEW

An MR read head transducer has a center portion known as an MR stripe. The MR stripe is the portion of the MR head that actually senses the magnetic characteristics of the magnetic media in a DASD (such as storage platters), thereby reading the data recorded on the magnetic media. The effect that the ambient temperature and the bias current will have on a given MR read head is integrally tied to the physical geometry of the MR stripe. The typical dimensions of an MR stripe are becoming smaller to achieve a higher density of data recorded on the media. In addition, the width and length of a bit region on the media are also shrinking, resulting in smaller signal levels while reading the recorded data. The intrinsic loss of signal level with smaller sensors must be compensated for by using a combination of magnetic storage media improvements, reductions in the distance between the MR read heads and the surface of the storage media, more sophisticated signal processing techniques, and other MR read head technology advances. However, the rate of improving the range of geometric variability in head stripe is slower than the rate of other improvements. As a result, physical variations in the geometries of the MR stripe are becoming more of a problem.

In the design of a typical MR read head, the tolerances on the MR stripe height represent a ±33% change, which, with respect to the ratio of the highest stripe height to the lowest stripe height, represents a 2:1 ratio. Further, the tolerance of the width of the MR stripe (length in the direction of current flow) is ±20% and the tolerance of the MR stripe thickness is ±10%. If each of these individual measurements are considered as independent variations, the statistical total additive variation in the resistance of the typical MR stripe due to physical geometry is approximately ±40%, or a high to low ratio of 2.33:1.

Generally, the amount of bias current supplied to all of the MR read heads within a DASD is identical. Due to the geometric variability of the MR stripes, this fixed-level biasing method can cause a significant difference in the amount of power dissipation for different heads within a device. In addition, current density varies significantly within each MR stripe because the cross-sectional area for the bias current (stripe height by thickness) also varies by a large amount.

In a typical disk drive unit, MR read head life is inversely related to the cube of the current density, and exponentially to temperature (with higher temperatures being more detrimental than lower temperatures). Given the differences in the MR stripe geometries, there tends to be a large variation in the resistance and current density in the different MR stripes. Relatively thin MR stripes that have low heights will have correspondingly higher resistances and higher current densities. This, in turn, results in higher levels of power dissipation. The resulting increased power dissipation causes significantly more temperature rise than would be associated with a higher and thicker MR stripe. Temperature and current density effectively compound and thereby decrease the life expectancy for an MR head with a thinner, lower MR stripe when compared to MR read heads that have a thicker, higher MR stripe.

The overall temperature of an MR stripe is a function of the ambient temperature of the air surrounding the MR stripe, the heat generated by the current passing through the MR stripe, and the thermal resistance between the two. Heat generated within the MR stripe is dissipated through one or more thermal paths to the environment surrounding the MR read head. The heat generated in the MR stripe, the thermal resistance, and the ambient temperature are all selected to keep the temperature of the MR stripe below some predetermined maximum temperature threshold.

The maximum temperature threshold is selected to assure that all MR heads within manufacturing tolerances will operate for a minimum period of time after accounting for the effects of electromigration. The maximum allowable current for all of the MR read heads will be determined by the worst-case scenario. This means that many MR read heads within a given DASD will potentially be capable of withstanding bias current in excess of the supplied level. The maximum absolute temperature of each MR stripe controls the electromigration for that MR stripe. In other words, it is the combination of the ambient temperature and the temperature rise associated with the current passing through the stripe that shortens the life of the MR stripe.

Another consideration is that all of the factors listed above that increase MR stripe resistance also increase the signal sensitivity when all of the MR read heads are supplied at a fixed level of bias current. This means that the best signal-to-noise ratio will typically be found in MR heads that have MR stripes with the highest resistance. Thus, MR heads with low, thin MR stripes produce good signal-to-noise ratios, while MR heads with high, thick MR stripes produce poorer signal-to-noise ratios. Typically, for a given bias current, the MR head with the shorter life expectancy will also be more sensitive to the signal. Since there are multiple MR read heads with different geometries in a given DASD unit, the bias current will affect each of the MR read heads differently and each MR read head will have a different life expectancy and a different signal sensitivity.

Therefore, when selecting the bias current for a DASD unit, the design engineer has to make a trade off between increasing MR head signal sensitivity and decreasing product life. Since the geometries of the MR stripes within the DASD unit varies greatly, a given bias current may shorten the life span of some of the MR stripes unnecessarily and may also cause certain MR stripes to perform at less than optimal sensitivity levels. A fixed-level bias current must necessarily be a compromise between good signal-to-noise ratio for most of the MR transducer heads and shorter life expectancy for some of the MR transducer heads.

A partial solution to the large variation in the temperature rise due to the geometric variability in the MR head is presented in U.S. Pat. No. 5,412,518, "INDIVIDUAL MR TRANSDUCER HEAD/DISK/CHANNEL ADAPTIVE BIAS CURRENT SYSTEM," issued to Christner, et al., and assigned to IBM. This patent discloses a method for biasing an MR read head that tends to adjust the bias supply according to variations in MR stripe height. While this solution provides for driving the MR heads at more optimum values of bias current, these values are computed at the maximum operating temperature of the DASD unit, which is again a worst-case scenario.

It should be noted that the bias current for an MR read head can be provided in different ways. For example, a current source may be used to bias the MR read head. Alternatively, a voltage source may be provided and used to bias the MR read head. In conjunction with the present invention, whenever a bias supply source or bias current supply is referenced, it should be construed to include any method known in art for supplying a bias current to an MR read head.

The tradeoff for selecting the bias level for a DASD is that the higher bias currents will shorten the life of the transducer head, ultimately leading to device failure. The goal is to provide the highest possible bias current for a given temperature while maintaining an acceptable operating lifespan for all of the MR read heads in a DASD.

DETAILED DESCRIPTION

In accordance with the present invention, an optimal MR transducer head bias supply is adaptively determined by sensing any temperature that has a known relationship to the temperature of the MR stripe (e.g., ambient temperature surrounding the MR transducer head), and calculating the maximum temperature rise at the MR stripe. The amount of bias supplied to the MR transducer head is then adjusted to the maximum allowable level for that temperature. The increased bias supply enhances the MR transducer head sensitivity, improves the signal-to-noise ratio, and thereby reduces errors in reading data from the magnetic storage media. The maximum allowable bias supply level is determined so as to preserve the overall life of each individual MR head.

It should be noted that although the description of the MR bias supply source circuit for the MR element shown in the figures is described as a current source, a suitable bias circuit may also include an adjustable voltage source, or another circuit of some non-zero and finite impedance, such as a resistor and a voltage source. The current source is one example of many suitable bias supply circuits within the scope of the present invention and should not be construed so as to limit the invention in any way. While bias current supply sources are well known and widely implemented, alternative methods of designing appropriate bias supply sources are well known to those skilled in the art.

Referring now to FIG. 1, a magnetic disk drive 100 according to the preferred embodiment of the present invention includes: a plurality of disks 101 with magnetic recording surfaces 102; a hub or spindle 103; base 104; a temperature sensor 105; a shaft 106; a plurality of head suspension assemblies 107; a plurality of MR transducer heads 108; a cover 109; and a circuit card 112. Temperature sensor 105 is any apparatus which is capable of determining the ambient temperature within the enclosure that houses MR heads 108 or any other temperature within the thermal path of MR read heads 108 that allows an empirical determination of the temperature rise of the MR stripe within an MR read head 108. For example, a direct temperature sensor could be used to measure the ambient temperature (e.g., of the housing that encloses MR read heads 108), once the relationship between ambient temperature and MR stripe temperature rise is determined. In the alternative, the characteristics of the arm electronics module may indicate a temperature change which may be directly related to the MR stripe temperature rise, or may be indirectly related to the MR stripe temperature rise by being directly related to the ambient temperature. Regardless of where temperature sensor 105 is located or how it measures temperature, temperature sensor 105 allows a determination of MR stripe temperature rise based on the known thermal characteristics of magnetic disk drive unit 100.

The amount of current supplied to MR heads 108 is determined by the ambient temperature sensed by temperature sensor 105. When the ambient temperature is lower than 65° C., then the amount of bias supplied is increased in order to increase the sensitivity of MR heads 108, thereby increasing the signal-to-noise ratio. The circuit for providing a quantized variable bias current to MR transducer heads 108 is shown in FIG. 2.

Figure 2:
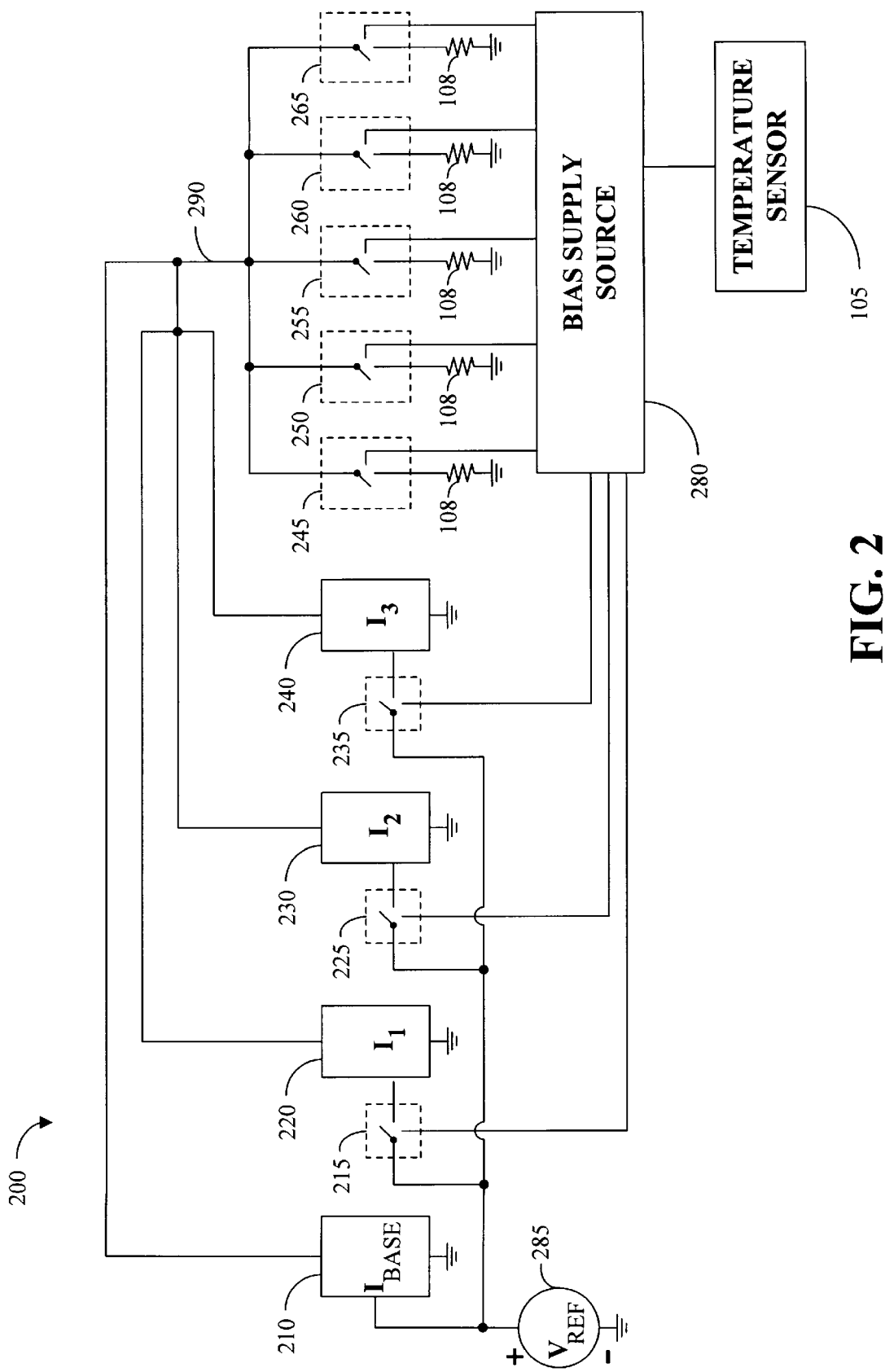
FIG. 2 is a block diagram that illustrates a preferred embodiment of a circuit for providing a variable quantized bias current to an MR head.

Referring now to FIG. 2, a circuit 200 for providing a quantized variable bias current to MR transducer heads 108 according to a preferred embodiment of the present invention includes: temperature sensor 105; a bias supply source 280 adapted to supply a current; a base current, $I_{BASE}$ 210; incremental input currents $I_1$ 220, $I_2$ 230, $I_3$ 240; a bias current output, $I_{BIAS}$ 290; a reference voltage 285; and transistor switches 215, 225, 235, 245, 250, 255, 260, 265. The level of bias current to be supplied to each of MR heads 108 by setting bias supply source 280 to an appropriate control value is determined based upon the ambient temperature as sensed by temperature sensor 105. Input currents $I_{BASE}$ 210, $I_1$ 220, $I_2$ 230, and $I_3$ 240 are combined in a binary fashion so that bias supply source 280 can output binary control signals to set the desired level of variable current $I_{BIAS}$ 290. Transistor switches 245, 250, 255, 260, and 265 are used to select which one of MR transducer heads 108 is to be biased. By closing the appropriate switch which activates a corresponding MR transducer head, any one of MR transducer heads 108 can be accessed. Transistor switches 215, 225, and 235 are used to adjust the amount of bias current that will be supplied to each of the selected MR transducer heads 108.

For purposes of illustration, assume that $I_{BASE}$ 210 is equal to 5 mA, $I_1$ 220 is equal to 1.25 mA, $I_2$ 230 is equal to 2.5 mA, and $I_3$ 240 is equal to 5 mA. Further assume that transistor switches 215, 225, and 235 are all initially open. To provide $I_{BIAS}$ 290 at an output level of 6.25 mA, bias supply source 280 will close transistor switch 215 in order to combine input currents $I_{BASE}$ 210 and $I_1$ 220. Similarly, to provide $I_{BIAS}$ 290 at an output level of 7.5 mA, bias supply source 280 will close transistor switch 225 in order to combine input currents $I_{BASE}$ 210 and $I_2$ 230. Similarly, to provide $I_{BIAS}$ 290 at an output level of 8.75 mA, bias supply source 260 will close transistor switches 215 and 225 to combine input currents $I_{BASE}$ 210, $I_1$ 220, and $I_2$ 230. By logical extension, additional levels of $I_{BIAS}$ 290 can be supplied by using appropriate combinations of the input currents. With the circuit and range of values specified for the input currents as described in FIG. 2, $I_{BIAS}$ 290 can be supplied in 1.25 mA increments at any desired level between 5 mA to 13.75 mA.

This specific example is provided to demonstrate the application of the present invention to a currently manufactured DASD unit that varies the bias current to each MR read head based on the physical dimensions of the MR stripe on each head, as disclosed in U.S. Pat. No. 5,412,518. The quantized current capabilities described above are already present and, therefore, extensive redesign of the DASD unit is not necessary to implement the invention. The wide range of selectable current values are used primarily to adjust the bias current to account for the variability of MR stripe geometries within a DASD unit. However, once the geometric variations have been accounted for, additional current values may be utilized to compensate the bias current for changes in the ambient temperature. Additional implications and adaptations of the present invention are contemplated and further described below.

Figure 3:
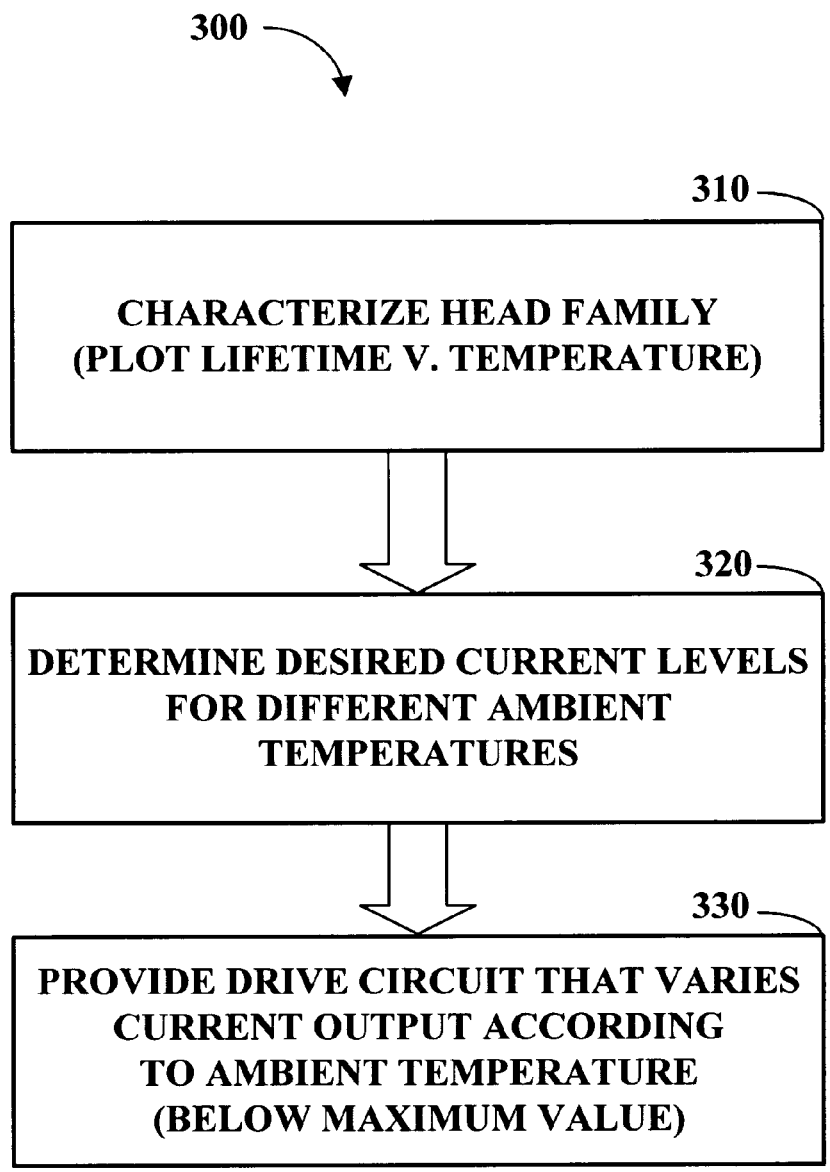
FIG. 3 is a flow chart describing the method of the present invention.

Referring now to FIG. 3, method 300 begins by characterizing the physical properties for the head family (step 310). This characterization includes deriving a plot of head lifetime vs. temperature for the MR stripe. This characterization may further include a determination of head lifetime vs. ambient temperature. Next, based on the results obtained in step 310, the desired bias current levels can be determined for ambient temperatures throughout the range of possible operating temperatures (step 320). Finally, once the desired current levels have been established, appropriate circuits can be designed and provided to supply the desired bias current for the actual ambient operating temperatures (step 330).

In accordance with the present invention, error rates at lower ambient temperatures can be reduced by increasing the bias current whenever the ambient temperature drops below the maximum operational design parameter for ambient temperature. In addition, the elevated bias current will not adversely affect the life expectancy of MR head 108 because it is predominantly the absolute maximum temperature of the MR stripe that determines life expectancy.

If an adjustable bias supply method, such as the one described in U.S. Pat. No. 5,412,518, is used with the method of the present invention, the overall performance of a population of MR read heads will be significantly better than the single, fixed-value bias supply method. With the additional adjustment for ambient temperature as disclosed herein, the performance of MR read heads will be improved for temperatures below the designed operational maximum ambient temperature.

TEST RESULTS

The maximum ambient temperature of a disk drive unit is typically rated at approximately 65° C. Empirical test data suggest that the maximum allowable temperature of the MR stripe is 155° C. Therefore, based on an overall maximum allowable MR stripe temperature of 155° C., 90° C. is the maximum allowable rise at the center of the MR stripe at the rated ambient temperature of 65° C.

The empirical data further suggest that the basic form of the equation used to calculate the life expectancy of the MR head varies inversely (approximately) with the cube of the current density J (in amps/cm$^2$), and exponentially with the exponent of E/(kT/q) or LIFETIME $\propto$ $(1/J^3) * e^{[E/(kT/q)]}$. The value of E, the activation energy, has been experimentally determined as 1.35 electron volts (ev), k represents Boltzmann's constant, q is the charge of an electron, and T is equal to the absolute temperature in degrees Kelvin (K). The exponential portion of the equation can therefore be simplified to 18,573/T where both the numerator and the denominator are expressed in degrees K. Combining the above equations, it can be seen that LIFETIME $\propto$ $(1/J^3) * e^{(18,573/T)}$.

The figures in TABLE 1 below present several different scenarios for evaluating the relationship between the ambient temperature and the bias current in a typical MR transducer read head. Case I is an extreme case limit. The MR head is assumed to be at the maximum assumed MR stripe and ambient temperature limits. The initial current is assumed to be $I_0$, and the initial MR stripe resistance at the high temperature is assumed to be $R_0$. Case II is for the same MR stripe being supplied with a 10% higher bias current and the temperatures calculated so as to result in the same component life expectancy. Case III is, once again, for the same MR stripe only this time being supplied with a 20% higher bias current and the temperatures calculated so as to result in the same component life expectancy.

TABLE 1

|  |  | Case I | Case II | Case III |
|---|---|---|---|---|
| Current/$I_0$ |  | 1.000 | 1.100 | 1.200 |
| Max Temp | (deg K.) | 428.16 | 425.36 | 422.83 |
| Max Temp | (deg C.) | 155.00 | 152.20 | 149.67 |
| Ambient Max Temp | (deg C.) | 65.00 | 45.28 | 25.10 |
| Temp Rise at Center | (deg C.) | 90.00 | 106.92 | 124.57 |
| Average Rise | (deg C.) | 60.00 | 71.27 | 83.05 |
| Average Temp | (deg C.) | 125.00 | 116.55 | 108.62 |
| Resistance/$R_0$ | (deg C.) | 1.000 | 0.981 | 0.962 |

It should be noted from the results presented above that the relationship between the change in ambient maximum temperature and the bias current is quite linear. The results show that if the ambient temperature is approximately 45° C. (a 20° drop in ambient temperature), then the bias current for the MR head can be 10% higher than the original maximum bias current previously determined for an ambient temperature of 65° C. In addition, if the ambient temperature is approximately 25° C. (a 40° drop in ambient temperature), then the bias current for the MR head can be 20% higher than previously determined for an ambient temperature of 65° C. The bias current can be increased as indicated without any additional detrimental impact on the life expectancy of the MR head component.

In addition, since the results are very linear, the solution can be extended as a continuous function of bias current and ambient temperature. Thus the maximum effect would be obtained if a multiplier of the current had a direct linear decrease in magnitude with higher temperature, or inversely, a higher current with a lower temperature. The ambient temperature may be determined by a direct temperature sensor or estimated by using the temperature of the arm electronics module. As described above, the relationship between the ambient temperature and the temperature of the MR stripe can be determined empirically.

With properly designed hardware, the bias current can be optimally adjusted for temperature by using a continuously variable bias current. For example, using a temperature sensor with a linear change in output voltage with temperature, and the proper gain and offset, the resulting voltage can drive the reference for a current source (or sources) to provide the correct proportional change in bias current that varies with the temperature with continuous analog variation.

Alternatively, incremental quantized current values may be used to digitally adjust the bias current according to temperature. This is particularly useful when a DASD device already has a digitally adjusted bias current which provides compensation for MR stripe tolerances. The examples below demonstrate the temperature-dependant adjustment of the bias current for a typical DASD device that uses an adjustable bias current supply source with preset 1.25 mA increments.

For an MR read head with a normal bias current of 6.25 mA at 65° C., if the ambient temperature were determined to be 25° C., the bias current could be increased by 20% to 7.5 mA. For an MR head with a normal bias current of 12.50 mA at 65° C., if the ambient temperature were determined to be 45° C., the bias current could be increased by 10% to 13.75 mA. Note that any suitable increments of current may be selected as a matter of design choice. Any and all increments and combinations of increments are within the scope of the present invention. In addition, with properly designed hardware, the bias current could be optimally adjusted using a continuously variable bias current rather than using the incremental quantized current values as described above and as shown in the figures.

With a precise temperature determination, all MR heads could have the bias current increased up to a maximum of 30% at the coldest ambient temperature of about 5° C. Theoretically, the increase in bias current could result in an improvement of two or three orders of magnitude in the error rate at low ambient temperatures when compared to the error rate for an unadjusted operating environment.

During operation of the disk drive unit, each time a head switch command occurs, the bias current value can be determined by calculating the maximum bias current level possible at the current ambient temperature. The active head can then be biased with the current value indicated. The temperature dependant nature of the bias current circuit means that a higher bias current will be supplied at lower temperatures and a lower bias current will be supplied at higher temperatures.

The focal point of the present invention is the realization that regardless of the method of determining bias presently employed, if the ambient temperature is lower than the maximum rated operational ambient temperature, then the MR stripe can handle additional bias without any loss in average life expectancy in the MR transducer head population. The increased bias will boost the sensitivity of the MR stripe and improve the performance of the MR read head. It is important to note that regardless of the overall ambient temperature drop, at no time will the bias circuit allow the temperature of the MR stripe to exceed the currently contemplated maximum operational temperature of 155° C. (428° K). It should also be noted that future improvements in component design and processing methods may allow for additional increase above this current maximum temperature level. Such improvements are contemplated and are within the scope of the present invention.

This invention is not a complete answer to the questions about the overall cause of the degradation of the performance of the DASD unit at lower ambient temperatures. However, recognizing that a loss of signal-to-noise ratio is the net result of the problem, anything that improves the signal-to-noise ratio will help to compensate for that loss. By adjusting the bias supplied to the MR read head to account for variations in temperature, the error rates at lower temperatures are drastically reduced, without sacrificing the life expectancy of the MR transducer head component.

While the present invention has been particularly shown and described with reference to preferred embodiments thereof, it will be understood by those skilled in the art that various changes in form and details may be made therein without departing from the spirit and scope of the invention.

I claim:

1. A direct access storage device (DASD) comprising:
   at least one magnetoresistive transducer read head coupled to a bias supply;
   a circuit for adaptively controlling the bias supply, the circuit comprising:
      a temperature sensor, the temperature sensor sensing an ambient temperature surrounding the magnetoresistive transducer read head; and,
      an adjustable bias supply source coupled to the temperature sensor and the magnetoresistive transducer read head, the adjustable bias supply source providing a bias for the magnetoresistive transducer read head that varies according to the temperature sensed by the temperature sensor.

2. The circuit of claim 1 wherein the adjustable bias supply source supplies a bias current derived from a plurality of input currents.

3. A circuit for adaptively controlling the bias supply source for a magnetoresistive transducer read head, the circuit comprising:

a temperature sensor, the temperature sensor sensing an ambient temperature surrounding the magnetoresistive transducer read head; and, an adjustable bias supply source coupled to the temperature sensor and the magnetoresistive transducer read head, the adjustable bias supply source providing a bias for the magnetoresistive transducer read head that varies according to the temperature sensed by the temperature sensor.

4. The circuit of claim 3 wherein the adjustable bias supply source supplies a bias current derived from a plurality of input currents.

5. The circuit of claim 3 wherein the adjustable bias supply source is controlled by an analog circuit that supplies a continuously variable bias current.

6. The circuit of claim 3 wherein the temperature sensor detects the ambient temperature of an arm electronics module coupled to the magnetoresistive transducer read head.

7. A method of adaptively controlling a bias supply source for a magnetoresistive transducer head, the method comprising the steps of:

sensing an ambient temperature surrounding the magnetoresistive transducer head;

adjusting the bias supply source according to the temperature; and, supplying the adjusted bias to the magnetoresistive transducer head.

8. The method of claim 7 wherein the bias supply source supplies a bias current derived from a plurality of input currents.

9. The method of claim 7 wherein the step of sensing the temperature is accomplished by sensing the temperature of an arm electronics module to estimate the temperature of a magnetoresistive stripe in the magnetoresistive transducer head.

10. In a magnetic data storage device having data recorded in tracks on a media surface and including at least one magnetoresistive transducer head, a method of adaptively controlling a bias supply source for the magnetoresistive transducer head, the method comprising the steps of:

sensing the ambient temperature surrounding the magnetoresistive transducer head;

supplying a bias to the magnetoresistive transducer head from the bias supply source;

increasing the bias as the ambient temperature decreases; and, decreasing the bias as the ambient temperature increases.

11. The method of claim 10 wherein the bias supply source supplies a bias current derived from a plurality of input currents.

12. The method of claim 10 wherein the bias supply source is controlled by an analog circuit that supplies a continuously variable bias current.

13. The method of claim 10 wherein the step of sensing the ambient temperature is accomplished by sensing the temperature of an arm electronics module to estimate the temperature of a magnetoresistive stripe on the magnetoresistive transducer head.

14. The method of claim 10 wherein the bias supplied to the magnetoresistive transducer head is maintained below a certain level, thereby ensuring that the temperature of the magnetoresistive transducer head does not exceed a pre-determined threshold level.

15. The method of claim 14 wherein the pre-determined threshold level is 155° C.

16. The method of claim 10 wherein the bias supply source comprises an adjustable voltage source.

17. A method of adaptively controlling a bias supply source for a family of magnetoresistive transducer heads, the method comprising the steps of:

characterizing the magnetoresistive transducer head family by plotting the lifetime versus the temperature;

determining the maximum bias possible for each different temperature level that is desirable without prematurely degrading head life; and, supplying a circuit that provides the maximum allowable bias considering the ambient temperature and head family lifetime.

\* \* \* \* \*